United States Patent [19]
Johnson

[11] Patent Number: 5,247,774
[45] Date of Patent: Sep. 28, 1993

[54] TOWER CONSTRUCTED OF PULTRUDED COMPOSITES

[76] Inventor: David W. Johnson, 1884 Sunset Blvd., San Diego, Calif. 92103

[21] Appl. No.: 715,912

[22] Filed: Jun. 14, 1991

Related U.S. Application Data

[63] Continuation-in-part of Ser. No. 541,547, Jun. 21, 1990, Pat. No. 5,024,036.

[51] Int. Cl.⁵ .............................................. E04C 3/02
[52] U.S. Cl. ................... 52/697; 52/651.02; 174/45 R
[58] Field of Search ................ 52/697, 648; 174/45 R

[56] References Cited

U.S. PATENT DOCUMENTS

| | | | |
|---|---|---|---|
| 1,917,594 | 7/1933 | Marshall | 52/697 |
| 3,342,925 | 9/1967 | Lewis | 52/397 |
| 3,574,104 | 4/1971 | Medler | 174/45 R |
| 4,569,165 | 2/1986 | Baker | 52/309.1 |
| 4,615,154 | 10/1986 | Troatner | 52/697 |
| 4,769,967 | 9/1988 | Baarrieres | 174/45 R |
| 4,788,088 | 11/1988 | Kohl | 174/36 |
| 4,803,819 | 2/1989 | Kelsey | 52/101 |

*Primary Examiner*—Henry E. Raduazo
*Attorney, Agent, or Firm*—Ralph S. Branscomb

[57] ABSTRACT

A high voltage electrical transmission line tower is constructed virtually completely from insulated pultruded composites, enabling the closer spacing of conductors and the creation of a smaller tower structure and weighing half or less the weight of a steel tower with the same power transmitting capabilities.

5 Claims, 2 Drawing Sheets

TOWER CONSTRUCTED OF PULTRUDED COMPOSITES

This invention is a continuation in part of U.S. Pat. No. 5,024,036 to issue Jun. 18, 1991 on an INTERLOCKING SUPPORT STRUCTURES, filed Jun. 21, 1990 having Ser. No. 541,547.

BACKGROUND OF THE INVENTION

The inventions combines the fields of high voltage transmission towers and pultruded composite construction. The inventor has several patents and several pending applications that relate in one way or another to interlocking joints formed of pultruded composites. A pultruded composite is a mass of fibers, generally fiberglass, that are pulled through the die rather than being pushed (extruded). Currently, virtually all such towers are made of steel. However, there are inherent limitations of steel towers primarily because of the conductive nature of steel. This requires that enormous towers must be used both to separate the individual conductors from the steel structure and to accommodate intertower sag.

There are few large structures made of pultruded composites. This is partly due to the fact that when composite members are fastened with conventional fasteners such as bolts and screws, the joint strength suffers unacceptably.

However, nuts and bolts are not the only ways to hold composite members together. The inventor has developed a number of interlocking joint structures that do not require passing a hole through the members.

SUMMARY OF THE INVENTION

The invention is a high voltage transmission tower made almost completely from composites. By using composite construction, the weight of the tower is reduced by more than half, and there are other advantages including reduced inductive reactance due to the absence of a large steel structure in the vicinity of the wire, and closer phase-to-phase spacing.

DETAILED DESCRIPTION OF THE PREFERRED EMBODIMENT

Figure 1:
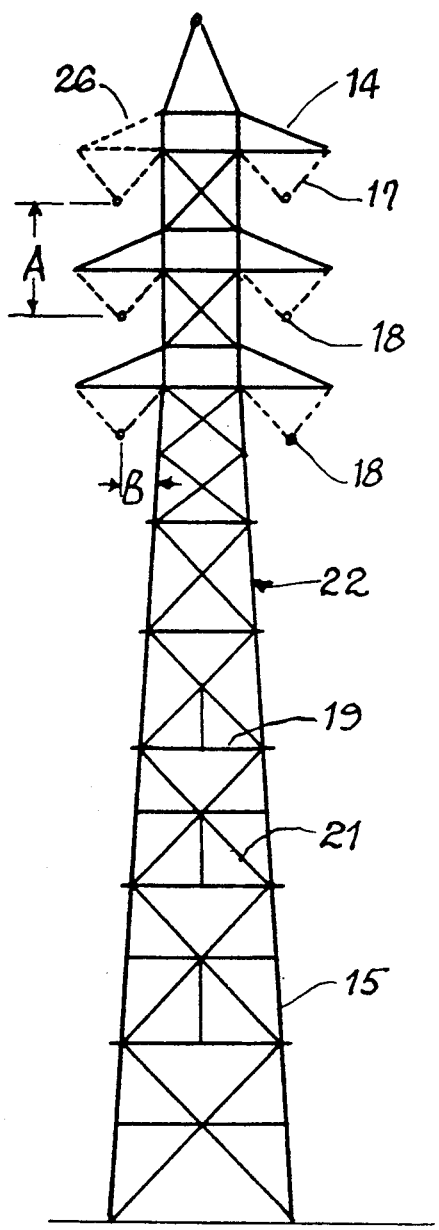
FIG. 1 is a diagrammatic view of a tower made according to the invention.

A typical prior art tower is indicated at 10. It consists of a lattice structure 12, sometimes called a "cage" with extended support arms 14, leg members 15, horizontal bracing members 19, and diagonal bracing members 21. Strings of insulators indicated at 16 support the power lines 18. A "goat peak" 20 supports a lightning shield wire, not shown. The structure in FIG. 2 is all L-angled steel, and is bolted together with as many as 1500 bolts.

The invention is shown in FIG. 1. Although similar in appearance to the prior art, it is vastly different, being made of pultruded composites, and having no bolts. The predetermined distance between the respective high voltage wire conductors 18 is identified by the letter A and the predetermined distance between the high voltage wire conductors 18 and the legs 15 of the tower is identified by the letter B.

Figure 3:
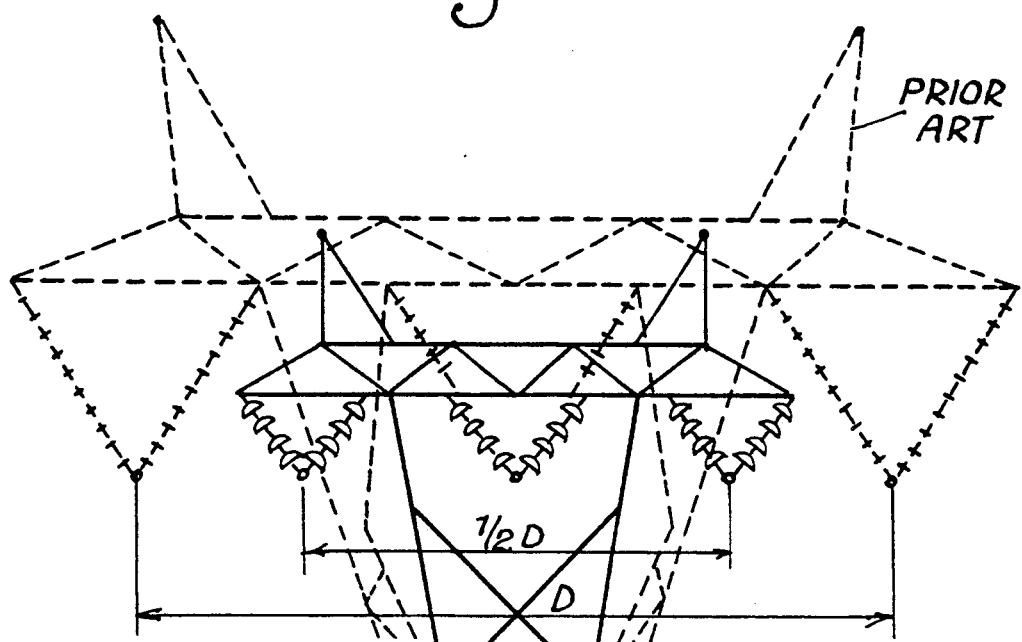
FIG. 3 is a prior art tower with a composite tower superimposed on for size comparison purposes; and, FIG. 4 illustrates the relationship between wet insulator flashover and the size of the gap between the conductor and ground, that is the distance between the conductor and the grounded steel structure.
Figure 4:
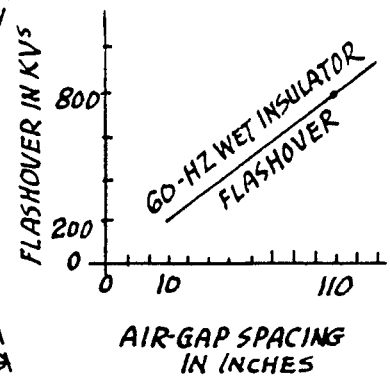

The spacing of the "phases", or individual cables, is fairly narrowly defined by the amount of voltage the lines carry. The wet-insulation flashover should be four times the line-to-ground voltage. For example a three-conductor tower carrying 345 kilovolts is first divided by the square root of 3, which equals approximately 200 kilovolts. Since four times two hundred equals 800 kilovolts, an insulator string is selected to space the conductor from the metal tower sufficiently to have a minimum of 800 kilovolt flashover with wet insulation. The chart in FIG. 4 illustrates how to convert from a flashover voltage to air gap spacing. Therefore, at 345 kv, the conductors must be approximately 110 inches from ground potential, which basically includes all of the tower. Referring to the drawing of FIG. 3, a modified form 24 of the new tower can be seen superimposed on the equivalent metal tower 10. By eliminating the conductive material in the tower, it can be seen that the wires can be brought in to approximately half of their former spacing in the new composite tower.

Figure 2:
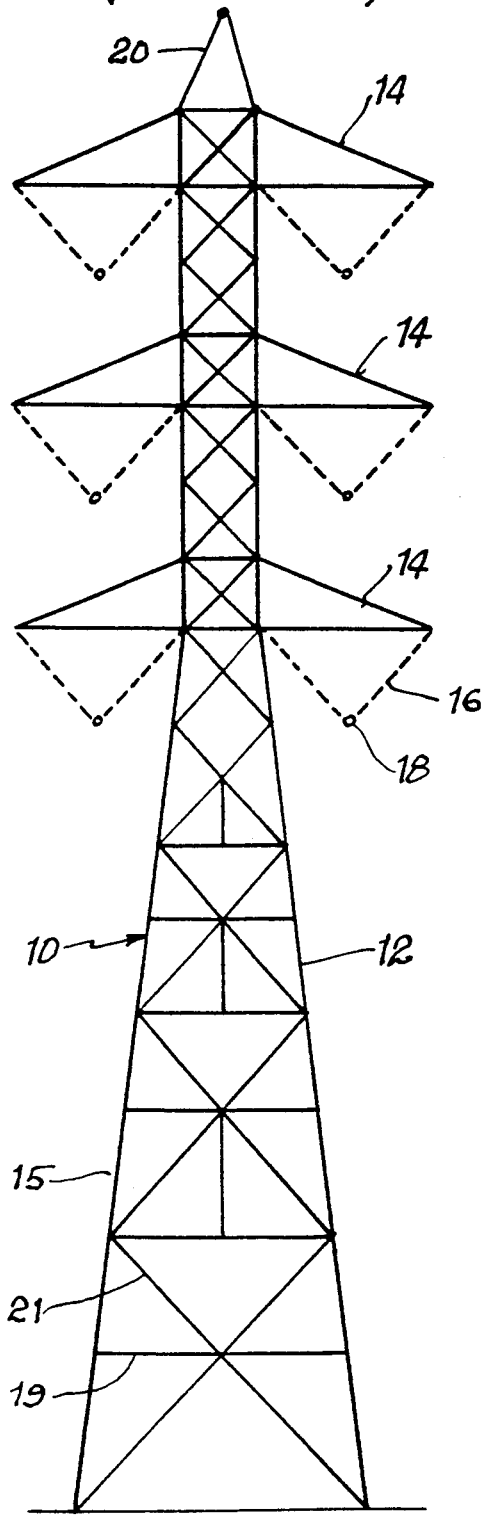
FIG. 2 represents diagrammatically a prior art tower.

This same efficiency in spacing is apparent in FIG. 1 as the tower 22 is approximately 80% as high as the tower of FIG. 2. The closest conductor to ground level, 18, remains at the same height in both configurations, to ensure with conductor sag, the minimum safe height above ground level is achieved. However, in FIG. 1, a compaction of conductors, or phases, is possible because the tower is a fully insulative composite and the design criteria of FIG. 4 is no longer a limiting criteria. Thus the insulator lengths, 17 in FIG. 1 are shown one half the length of the insulators 16 in FIG. 2.

The insulator length of FIG. 1 was illustrated as one half the typical length required of a steel tower. However, the insulation could be eliminated as a separate unit 17 in FIG. 1. This could be achieved by adding the silicone rubber sheds, a common "tracking" resistant skirt material used in high voltage polymer insulators, to extended rods which are an integral structure of the tower as shown at 26 in FIG. 1. In lieu of separate insulators, the sheds that are generally installed on insulator rods will be installed directly on a portion of the tower adjacent to the attachment point of the conductor. This is shown on just one arm of the tower in FIG. 1 at 26 but would of course replace all of the hanging insulators.

By compacting the conductors, the tower height is reduced, the right-of-way owned by the entity transmitting electricity is more compact, energy is transmitted more efficiently due to lower inductive reactance, the electric magnetic field at ground level (EMF) is reduced, and further reduction in weight is achieved.

It is hereby claimed:

1. A high voltage electrical transmission tower for use in areas where maximum limits on EMF forces at the ground level are desirable in the vicinity of transmission lines comprising:
    (a) a vertically oriented three dimensional support lattice structure having a top end and a bottom end, said support lattice structure having at least three upright oriented leg members that are structurally connected to each other by cross bracing members;
    (b) means for supporting at least three high-voltage wire conductors, for conducting at least partially mutually out-of-phase currents, adjacent the top end of said support lattice structure in a predetermined configuration in which said high-voltage wire conductors are each spaced from the next closest of said wire conductors at least a minimum predetermined distance of A and are spaced at least a minimum predetermined distance B from said vertically oriented three dimensional support lattice structure, at least a portion of said support lattice including said vertical leg members and substantially all of said cross bracing members in the vicinity of said three high voltage wire conductors being constructed of pultruded material whereby induced EMF from metal components of said tower is eliminated or avoided and said three dimensional lattice is formed with reduced vertical height for said maximum EMF limit at the ground level.

2. A high-voltage electrical transmission tower as recited in claim 1 wherein said high voltage wire conductors are designed to carry at least 115 kilovolts and said lattice structure is configured and dimensioned to support said wire conductors spaced with minimum distances A and B as predetermined by industry standards from 115-KV voltage class towers having the electromagnetic and electrical characteristics of pultruded composites of the type used in said tower.

3. A high voltage electrical transmission tower as recited in claim 1 wherein substantially all of the leg members and bracing members of said three dimensional support lattice structure are made of pultruded composite material.

4. A high voltage electrical transmission tower as recited in claim 1 wherein said means for supporting said high voltage wire conductors is a single laterally extending support arm that has strings of insulators supporting said three high voltage wire conductors.

5. A high voltage electrical transmission tower as recited in claim 1 wherein said means for supporting said high voltage wire conductors are three vertically spaced laterally extending support arms that each have a string of insulators supporting a respective high voltage wire conductor.

* * * * *